United States Patent
Kang

(10) Patent No.: US 10,689,283 B2
(45) Date of Patent: Jun. 23, 2020

(54) MANUFACTURING PROCESS FOR PREVENTING SHARDS OF HEAT-RESISTANT GLASSWARE FROM SCATTERING

(71) Applicant: HEBEI MSD GLASS TECHNOLOGY CO., LTD, Hejian (CN)

(72) Inventor: Kee Chuan Kang, Hejian (CN)

(73) Assignee: HEBEI MSD GLASS TECHNOLOGY CO., LTD, Hejian (CN)

( * ) Notice: Subject to any disclaimer, the term of this patent is extended or adjusted under 35 U.S.C. 154(b) by 184 days.

(21) Appl. No.: 15/928,983

(22) Filed: Mar. 22, 2018

(65) Prior Publication Data

US 2018/0346366 A1 Dec. 6, 2018

(30) Foreign Application Priority Data

Jun. 2, 2017 (CN) .......................... 2017 1 0409442

(51) Int. Cl.
| | |
|---|---|
| *C03B 23/04* | (2006.01) |
| *C03B 25/02* | (2006.01) |
| *C03C 17/00* | (2006.01) |
| *C03C 17/25* | (2006.01) |
| *G01M 7/08* | (2006.01) |
| *G01M 99/00* | (2011.01) |

(52) U.S. Cl.
CPC ............. *C03B 23/04* (2013.01); *C03B 25/02* (2013.01); *C03C 17/003* (2013.01); *C03C 17/009* (2013.01); *C03C 17/25* (2013.01); *G01M 7/08* (2013.01); *G01M 99/002* (2013.01); *C03C 2217/213* (2013.01); *C03C 2217/478* (2013.01); *C03C 2217/78* (2013.01); *C03C 2218/112* (2013.01)

(58) Field of Classification Search
None
See application file for complete search history.

(56) References Cited

U.S. PATENT DOCUMENTS

| | | | | |
|---|---|---|---|---|
| 4,226,607 A * | 10/1980 | Domken | ................. | A61J 1/065 65/105 |
| 4,231,778 A * | 11/1980 | Graham | ................. | C03B 25/06 65/117 |
| 2015/0291806 A1* | 10/2015 | Turner | ................... | A47G 19/12 206/524.3 |
| 2016/0107921 A1* | 4/2016 | Brown | ................. | C03B 9/3858 65/349 |

* cited by examiner

*Primary Examiner* — Lisa L Herring
(74) *Attorney, Agent, or Firm* — Muncy, Geissler, Olds & Lowe, P.C.

(57) ABSTRACT

The Invention discloses a manufacturing process for preventing shards of heat-resistant glassware from scattering, comprising the following steps: manufacturing a heat-resistant glass tube into corresponding product ware; performing annealing to remove stress; performing thermal shock testing; performing mechanical shock testing; performing mechanical spraying, and performing baking for 10 minutes to 30 minutes at 180° C. to 220° C. by using IR or in a baker. After this solution is used, shards of heat-resistant glassware are prevented from scattering.

1 Claim, No Drawings

MANUFACTURING PROCESS FOR PREVENTING SHARDS OF HEAT-RESISTANT GLASSWARE FROM SCATTERING

FIELD OF THE INVENTION

The Invention relates to the field of ware manufacturing technology, and in particular, to a manufacturing process for preventing shards of heat-resistant glassware from scattering.

BACKGROUND OF THE INVENTION

1. Plastic ware is made of an organic polymer material and cannot withstand high temperature for a long time. Therefore, it is not suitable to steam or boil the plastic ware to perform high-temperature disinfection. After a long time of use, the material ages easily and releases substances harmful to human body. A plasticizer is added during manufacturing of the material. A plasticizer contains phthalates that have effects similar to those of artificial hormones. Phthalates are detrimental to fertility in males and causes precocious puberty in females, and long-term intake of large amounts of phthalates causes liver cancer. In addition, plastic ware has low transparency, and it is not easy to clean and observe plastic ware.

At present, glassware is mostly sodium-calcium glassware. Sodium-calcium glassware has poor chemical stability. Delamination occurs after a long time of use, and glass particles may be absorbed by human body to enter blood to form a thrombus. In addition, calcium glass has poor resistance to sudden heat and sudden cold, cannot be steamed or boiled for high-temperature disinfection, and cracks easily if hot water and cold water are alternately poured.

Stainless steel ware has high manufacturing costs, and thin rims of stainless steel ware make it uncomfortable to drink water. After being kept in stainless steel ware for a long time, water is tainted and tastes like metal.

2. According to the advantages and disadvantages of commercially available glassware materials, we've chosen a special glass material that has a low expansion rate, high-temperature resistance, high strength, high hardness, high transparency, and high chemical stability. G3.3 high borosilicate glass has a linear expansion coefficient of $3.3\pm0.1\times 10^{-6}/K$. The basic components of G3.3 high borosilicate glass are sodium oxide ($Na_2O$), boron trioxide ($B_2O_3$), and silicon dioxide ($SiO_2$). The glass has relatively high content of boron and relatively high content of silicon. The content of boron is 12.5% to 13.5%, and the content of silicon is 78% to 80%. Therefore, this type of glass is called high borosilicate glass, and is PYREX glass of borosilicate glass. The glass is acid-resistant, alkali-resistant, and water-resistant, and has excellent corrosion resistance performance, desirable thermal stability, desirable chemical stability, and desirable electrical performance. Therefore, the glass has characteristics such as chemical corrosion resistance, thermal shock resistance, desirable mechanical performance, and high-temperature resistance.

However, if high borosilicate glassware is accidentally broken, shards are scattered and difficult to clean. The shards may cause dangers such as cuts to children and elders.

Therefore, the problem that urgently needs to be resolved in the field of manufacturing processes for preventing shards from scattering is to manufacture glassware that has stable chemical performance and is high-temperature resistant, easy to clean, made of a high borosilicate material whose expansion coefficient is 3.3, and healthy and safe.

SUMMARY OF THE INVENTION

The objective of the Invention is to provide a manufacturing process for preventing shards of heat-resistant glassware from scattering, to resolve the foregoing problems provided in the background.

To achieve the foregoing objective, the Invention provides the following technical solution:

A manufacturing process for preventing shards of heat-resistant glassware from scattering comprises the following steps:

(1) heating a heat-resistant glass tube according to a plan, and selecting a combination of manual manufacturing and mechanical manufacturing, to manufacture corresponding product ware;

(2) performing annealing to remove stress, and placing the product ware in an annealing furnace, wherein the furnace comprises four sections, temperatures of the sections are sequentially 390° C., 480° C., 590° C., and 550° C., a rotational speed is 415±15 rotations/minute, and a time that the product ware stays in each section is 25 minutes;

(3) performing thermal shock testing according to GB/T 6579-1986 Laboratory glassware—Methods for thermal shock test: placing glass in an oven, heating the glass to 170° C., keeping the glass at 170° C. for 15 minutes to 30 minutes, and then placing the glass in water at a constant temperature of 20° C., wherein the test standard is: the glass is nonconforming if there is a crack or fracture;

(4) performing mechanical shock testing: knocking the body of a cup with a steel ball whose weight is 3 oz, wherein the determining standard of testing is: no break or crack is allowed, and placing a glass product under a test fixture, and dropping the steel ball at a height of 76 mm from a test position vertically for impacting, wherein the test position comprises one inch below the rim, the middle of the exterior of the cup, one inch above the bottom of the exterior of the cup, and the center of the bottom of the exterior of the cup; and (5) first adding a diluent to a paint, stirring the diluent and the paint uniformly, wherein the diluent is naphtha, the paint is a silica paint, and a ratio of naphtha to the silica paint is 5 to 1, then adding a dedicated 3% Karstedt's catalyst, stirring the mixture uniformly, performing filtering with a small 250-mesh to 300-mesh filter, performing mechanical spraying, and performing baking for 10 minutes to 30 minutes at 180° C. to 220° C. by using IR or in a baker.

As compared with the prior art, the beneficial effects of the Invention are as follows: The Invention provides a manufacturing process for preventing shards of heat-resistant glassware from scattering. the Invention has advantages in the following aspects: In the manufacturing process for preventing shards of heat-resistant glassware from scattering, high borosilicate heat-resistant glass whose linear expansion coefficient is 3.3 is manufactured into glassware, and a silica paint technology is then combined. For the heat-resistant glassware that is processed by using this process, the silica paint is not sticky. Therefore, the function of heat-resistant glassware is kept, and when heat-resistant glassware is broken, shards are prevented from randomly scattering to injure a user. The application of heat-resistant glassware becomes increasingly wide, and heat-resistant glassware is used by an increasingly large number of people. The application of this process needs to be promoted.

DETAILED DESCRIPTION OF THE INVENTION

The technical solution of this patent is further described below in detail with reference to specific implementation manners.

Embodiment 1

A manufacturing process for preventing shards of heat-resistant glassware from scattering comprises the following steps:

(1) heating a heat-resistant glass tube according to a plan, and selecting a combination of manual manufacturing and mechanical manufacturing, to manufacture corresponding product ware;

(2) performing annealing to remove stress, and placing the product ware in an annealing furnace, wherein the furnace comprises four sections, temperatures of the sections are sequentially 390° C., 480° C., 590° C., and 550° C., a rotational speed is 415±15 rotations/minute, and a time that the product ware stays in each section is 25 minutes;

(3) performing thermal shock testing according to GB/T 6579-1986 Laboratory glassware—Methods for thermal shock test: placing glass in an oven, heating the glass to 170° C., keeping the glass at 170° C. for 16 minutes, and then placing the glass in water at a constant temperature of 20° C., wherein the test standard is: the glass is nonconforming if there is a crack or fracture;

(4) performing mechanical shock testing: knocking the body of a cup with a steel ball whose weight is 3 oz, wherein the determining standard of testing is: no break or crack is allowed, and placing a glass product under a test fixture, and dropping the steel ball at a height of 76 mm from a test position vertically for impacting, wherein the test position comprises one inch below the rim, the middle of the exterior of the cup, one inch above the bottom of the exterior of the cup, and the center of the bottom of the exterior of the cup; and (5) first adding a diluent (naphtha) to a silica paint, stirring the diluent and the silica paint uniformly, (diluent:silica paint=5:1), then adding a dedicated 3% Karstedt's catalyst, stirring the mixture uniformly, performing filtering with a small 250-mesh to 300-mesh filter, performing mechanical spraying, and performing baking for 16 minutes at 180° C. to 220° C. by using IR or in a baker.

Embodiment 2

A manufacturing process for preventing shards of heat-resistant glassware from scattering comprises the following steps:

(1) heating a heat-resistant glass tube according to a plan, and selecting a combination of manual manufacturing and mechanical manufacturing, to manufacture corresponding product ware;

(2) performing annealing to remove stress, and placing the product ware in an annealing furnace, wherein the furnace comprises four sections, temperatures of the sections are sequentially 390° C., 480° C., 590° C., and 550° C., a rotational speed is 415±15 rotations/minute, and a time that the product ware stays in each section is 25 minutes;

(3) performing thermal shock testing according to GB/T 6579-1986 Laboratory glassware—Methods for thermal shock test: placing glass in an oven, heating the glass to 170° C., keeping the glass at 170° C. for 28 minutes, and then placing the glass in water at a constant temperature of 20° C., wherein the test standard is: the glass is nonconforming if there is a crack or fracture;

(4) performing mechanical shock testing: knocking the body of a cup with a steel ball whose weight is 3 oz, wherein the determining standard of testing is: no break or crack is allowed, and placing a glass product under a test fixture, and dropping the steel ball at a height of 76 mm from a test position vertically for impacting, wherein the test position comprises one inch below the rim, the middle of the exterior of the cup, one inch above the bottom of the exterior of the cup, and the center of the bottom of the exterior of the cup; and (5) first adding a diluent (naphtha) to a silica paint, stirring the diluent and the silica paint uniformly, (diluent:silica paint=5:1), then adding a dedicated 3% Karstedt's catalyst, stirring the mixture uniformly, performing filtering with a small 250-mesh to 300-mesh filter, performing mechanical spraying, and performing baking for 25 minutes at 180° C. to 220° C. by using IR or in a baker.

The working principle of the Invention is as follows: The Invention provides a manufacturing process for preventing shards of heat-resistant glassware from scattering. The Invention has advantages in the following aspects: In the manufacturing process for preventing shards of heat-resistant glassware from scattering, high borosilicate heat-resistant glass whose linear expansion coefficient is 3.3 is manufactured into glassware, and a silica paint technology is then combined. For the heat-resistant glassware that is processed by using this process, the silica paint is not sticky. Therefore, the function of heat-resistant glassware is kept, and when heat-resistant glassware is broken, shards are prevented from randomly scattering to injure a user. The application of heat-resistant glassware becomes increasingly wide, and heat-resistant glassware is used by an increasingly large number of people. The application of this process needs to be promoted.

The preferred implementation manners of this patent are described above in detail. However, this patent is not limited to the foregoing implementation manners. Within the knowledge of a person of ordinary skilled in the art, various changes may further be made without departing from the spirit of this patent.

The invention claimed is:

1. A manufacturing process of heat-resistant glassware for preventing shards from scattering, comprising:

(1) heating a heat-resistant glass tube to manufacture the heat-resistant glassware;

(2) performing annealing to remove stress: placing and rotating the heat-resistant glassware in an annealing furnace, wherein the annealing furnace comprises four sections, temperatures of the sections are sequentially 390° C., 480° C., 590° C., and 550° C., a rotational speed of the heat-resistant glassware is 415±15 rotations/minute, and a time that the heat-resistant glassware stays in each section is 25 minutes;

(3) performing thermal shock testing: placing the heat-resistant glassware in an oven, heating the heat-resistant glassware to 170° C., keeping the heat-resistant glassware at 170° C. for 15 minutes to 30 minutes, and then placing the heat-resistant glassware in water at a constant temperature of 20° C., keeping the heat-resistant glassware that has no crack or fracture for performing step (4);

(4) performing mechanical shock testing: knocking a body of the heat-resistant glassware with a steel ball with a weight of 3 oz, placing the heat-resistant glassware under a test fixture, and dropping the steel ball at a height of 76 mm from a test position vertically for impacting, wherein the test position comprises one inch below a rim of the heat-resistant glassware, a middle of and exterior of the heat-resistant glassware, one inch above a bottom of the exterior of the heat-resistant glassware, and a center of the bottom of the exterior of the heat-resistant glassware, keeping the heat-resistant glassware that has no break or crack for performing step (5); and (5) first adding a diluent to a paint, stirring the diluent and the paint uniformly, wherein the diluent is naphtha, the paint is a silica paint, and a ratio of naphtha to the silica paint is 5 to 1, then adding a dedicated Karstedt's catalyst into the diluent and the paint obtaining a mixture of the naphtha, the silica paint and the Karstedt's catalyst, stirring the mixture uniformly, filtering the mixture with a small 250-mesh to 300 mesh filter, mechanical spraying the mixture onto the heat-resistant glassware, and baking the sprayed heat-resistant glassware for 10 minutes to 30 minutes at 180° C. to 220° C.

\* \* \* \* \*